(12) United States Patent
Cho

(10) Patent No.: US 12,716,464 B2
(45) Date of Patent: Aug. 25, 2026

(54) FREQUENCY-SENSITIVE SHOCK ABSORBER

(71) Applicant: HL MANDO CORPORATION, Pyeongtaek (KR)

(72) Inventor: Sewon Cho, Yongin (KR)

(73) Assignee: HL MANDO CORPORATION, Pyeongtaek (KR)

( * ) Notice: Subject to any disclaimer, the term of this patent is extended or adjusted under 35 U.S.C. 154(b) by 469 days.

(21) Appl. No.: 18/321,019

(22) Filed: May 22, 2023

(65) Prior Publication Data

US 2024/0035541 A1 Feb. 1, 2024

(30) Foreign Application Priority Data

Jul. 27, 2022 (KR) ........................ 10-2022-0093442

(51) Int. Cl.
*F16F 9/512* (2006.01)
*F16F 9/18* (2006.01)
(Continued)

(52) U.S. Cl.
CPC .............. *F16F 9/512* (2013.01); *F16F 9/185* (2013.01); *F16F 9/19* (2013.01); *F16F 9/34* (2013.01);
(Continued)

(58) Field of Classification Search
CPC ...... F16F 9/19; F16F 9/34; F16F 9/512; F16F 9/185; F16F 2222/12; F16F 2228/04;
(Continued)

(56) References Cited

U.S. PATENT DOCUMENTS 7,694,785 B2 * 4/2010 Nakadate .............. F16F 9/3484 188/266.5
7,757,826 B2 * 7/2010 Hayama .................. F16F 9/465 188/322.22
(Continued)

FOREIGN PATENT DOCUMENTS

CN 109790900 A 5/2019
CN 112081856 A 12/2020
(Continued)

OTHER PUBLICATIONS

Office Action From Chinese Patent Office Dated May 22, 2026 Issued for Corresponding Chinese Patent Application.

*Primary Examiner* — Christopher P Schwartz
(74) *Attorney, Agent, or Firm* — Harvest IP Law, LLP

(57) ABSTRACT

A frequency-sensitive shock absorber according to an embodiment of the present disclosure includes a valve assembly configured to generate a damping force that varies depending on a magnitude of a frequency, in which the valve assembly includes a main retainer having a main chamber configured to communicate with an injection flow path formed in a piston rod or a body pin, a main valve configured to open or close the main chamber, a housing having a pilot chamber having one side facing the main valve and the other side communicating with the injection flow path, and a pilot valve configured to cover the pilot chamber and press the housing toward the main valve while being elastically deformed when pressure in the pilot chamber is higher than a preset pressure.

20 Claims, 7 Drawing Sheets

(51) Int. Cl.
*F16F 9/19* (2006.01)
*F16F 9/34* (2006.01)
*B60G 13/08* (2006.01)
*B60G 17/08* (2006.01)

(52) U.S. Cl.
CPC .............. *B60G 13/08* (2013.01); *B60G 17/08* (2013.01); *B60G 2202/24* (2013.01); *B60G 2204/62* (2013.01); *B60G 2206/41* (2013.01); *B60G 2500/114* (2013.01); *B60G 2600/21* (2013.01); *B60G 2800/162* (2013.01); *B60G 2800/916* (2013.01); *F16F 2222/12* (2013.01); *F16F 2228/04* (2013.01); *F16F 2230/18* (2013.01); *F16F 2232/08* (2013.01); *F16F 2234/02* (2013.01)

(58) Field of Classification Search
CPC ............... F16F 2230/18; F16F 2232/08; F16F 2234/02; B60G 13/08; B60G 17/08; B60G 2202/24; B60G 2204/62; B60G 2206/41; B60G 2500/114; B60G 2600/21; B60G 2800/162; B60G 2800/916
USPC ............ 188/280–282.1, 282.5, 282.6, 282.8, 188/322.13, 322.15
See application file for complete search history.

(56) References Cited

U.S. PATENT DOCUMENTS

| | | | | |
|---|---|---|---|---|
| 8,794,405 | B2 * | 8/2014 | Yamashita | F16F 9/468 188/317 |
| 11,598,389 | B2 * | 3/2023 | Kim | F16F 9/3487 |
| 2016/0280031 | A1 | 9/2016 | Tsukahara | |
| 2020/0393015 | A1 * | 12/2020 | Kim | F16F 9/3482 |
| 2023/0358291 | A1 * | 11/2023 | Kim | F16F 9/369 |
| 2024/0019011 | A1 * | 1/2024 | Kim | F16F 9/3482 |
| 2024/0019012 | A1 * | 1/2024 | Kim | F16K 31/363 |
| 2024/0288048 | A1 * | 8/2024 | Cho | F16F 9/516 |
| 2025/0237286 | A1 * | 7/2025 | Cho | F16F 9/348 |

FOREIGN PATENT DOCUMENTS

| | | | |
|---|---|---|---|
| JP | 2011043220 | A | 3/2011 |
| JP | 2011202786 | A | 10/2011 |
| JP | 2012067880 | A | 4/2012 |

* cited by examiner

*400:410,420,430,440,450,460,470,480

*400:410,420,430,440,450,460,470,480

*400:410,420,430,440,450,460,470,480

*400:410,420,430,440,450,460,470,480

*400:410,420,430,440,450,460,470,480

FREQUENCY-SENSITIVE SHOCK ABSORBER

CROSS-REFERENCE TO RELATED APPLICATIONS

This application claims benefit and priority to Korean Patent Application No. 10-2022-0093442, filed on Jul. 27, 2022, with the Korean Intellectual Property Office, the disclosure of which is incorporated herein in its entirety by reference.

TECHNICAL FIELD

The present disclosure relates to a shock absorber, and more particularly, to a frequency-sensitive shock absorber capable of satisfying both ride quality and adjustment stability by performing control to vary damping forces depending on a high frequency and a low frequency in a compression stroke or an extension stroke of a piston valve.

BACKGROUND

In general, buffer devices are installed in a vehicle to improve ride quality by mitigating impact or vibration that an axle receives from a road surface while the vehicle travels. A shock absorber is used as one of the buffer devices.

The shock absorber is also called a damper and operated in accordance with vibration of the vehicle that occurs in accordance with a road surface state. In this case, a damping force generated from the shock absorber varies depending on an operating speed of the shock absorber, i.e., depending on whether the operating speed is high or low.

It is possible to control ride quality and traveling stability of the vehicle depending on how to adjust characteristics of the damping force generated from the shock absorber. Therefore, it is very important to adjust characteristics of the damping force of the shock absorber at the time of designing the vehicle.

For example, the shock absorber includes: a cylinder filled with a working fluid such as oil; a piston rod connected to a vehicle body and configured to reciprocate; and a piston valve coupled to a lower end of the piston rod and configured to slide in the cylinder and control a flow of a working fluid.

Meanwhile, the piston valve typically used for the shock absorber is designed to have predetermined damping characteristics at a high speed, a middle speed, and a low speed by using a single flow path. Therefore, in case that a low-speed damping force decreases to improve ride quality, the decrease in low-speed damping force may affect middle-speed and high-speed damping forces.

The shock absorber in the related art has a structure in which the damping force varies depending on a change in speed of a piston regardless of a frequency or a stroke. The damping force, which varies only depending on the change in speed of the piston as described above, generates the same damping force in response to various road surface states, which makes it difficult to satisfy both ride quality and adjustment stability.

SUMMARY

An object of an embodiment of the present disclosure is to provide a frequency-sensitive shock absorber capable of generating a damping force that varies depending on changes in frequency and speed.

An embodiment of the present disclosure provides a frequency-sensitive shock absorber including: a piston rod configured to reciprocate in a cylinder and having an injection flow path; a piston valve mounted on the piston rod and configured to divide the cylinder into a compression chamber and a rebound chamber; and a valve assembly mounted on the piston rod and configured to generate a damping force that varies depending on a magnitude of a frequency in an extension stroke. Further, the valve assembly includes: a main retainer coupled to the piston rod and having a main chamber configured to communicate with the injection flow path; a main valve coupled to the piston rod and configured to open or close the main chamber; a housing coupled to the piston rod and having a pilot chamber having one side facing the main valve, and the other side communicating with the injection flow path; and a pilot valve coupled to the piston rod and configured to cover the pilot chamber, the pilot valve being configured to press the housing toward the main valve while being elastically deformed when pressure in the pilot chamber is higher than a preset pressure.

The piston valve may include a plurality of compression flow paths and a plurality of extension flow paths penetratively formed in a direction in which the plurality of compression flow paths and the plurality of extension flow paths connect the compression chamber and the rebound chamber.

The injection flow path may be provided on an outer peripheral surface of one side of the piston rod and elongated in the form of a slit in a longitudinal direction of the piston rod.

The pilot valve, in a low-frequency extension stroke, may press the housing toward the main valve while being elastically deformed to allow the main valve to close the main chamber, and the pilot valve, in a high-frequency extension stroke, may be restored, such that the pressure applied to the housing may be eliminated, and the main valve may be opened.

The valve assembly may further include an inlet disc interposed between the housing and the pilot valve. Further, the inlet disc may include at least one slit formed to allow the pilot chamber and the injection flow path formed in the piston rod to communicate with each other so that a working fluid is introduced into the pilot chamber.

When in a low-frequency extension stroke, a stroke of the piston rod operates to be relatively larger than that in a high-frequency extension stroke, the amount of working fluid introduced into the pilot chamber may be increased, and the pressure in the pilot chamber may be raised, and when the pressure in the pilot chamber is higher than the preset pressure, the pilot valve may press the housing toward the main valve while being elastically deformed, and the housing may push the main valve to close the main chamber.

When in a high-frequency extension stroke, a stroke of the piston rod operates to be relatively smaller than that in a low-frequency extension stroke, the amount of working fluid introduced into the pilot chamber may be decreased, and the pressure in the pilot chamber may be lowered, and when the pressure in the pilot chamber is lower than the preset pressure, the pilot valve may be restored, the pressure applied to the housing may be eliminated, and the main valve may be opened, such that the working fluid in the main chamber may flow to the compression chamber.

When impact occurs, the main valve may be opened as the housing is moved by inertia toward the pilot valve, such that a working fluid in the main chamber may flow to the compression chamber to reduce the impact.

The valve assembly may further include a disc spring configured to elastically press the housing toward the main valve.

In at least one region in which the pilot valve faces the housing, an accumulator may be formed to maintain and mitigate the pressure in the pilot chamber.

The valve assembly may include: a washer mounted on the piston rod in the other direction opposite to one direction in which the pilot valve faces the housing; and a spacer mounted on the piston rod and configured to maintain an interval between the pilot valve and the housing.

When the pilot valve is elastically deformed, the pilot valve may push the washer, and a repulsive force against the force for pushing the washer may press the housing toward the main valve.

Another embodiment of the present disclosure provides a frequency-sensitive shock absorber including: a first cylinder divided into a compression chamber and a rebound chamber by a piston rod, which reciprocates in the first cylinder, and a piston valve mounted on the piston rod; a second cylinder configured to surround the first cylinder to define a reserve chamber between the first cylinder and the second cylinder; a body valve installed at an end of the compression chamber of the first cylinder and configured to adjust a flow of a working fluid between the compression chamber and the reserve chamber; a body pin fastened to penetrate the body valve and having an injection flow path configured to communicate with the compression chamber; and a valve assembly mounted on the body pin and configured to generate a damping force that varies depending on a magnitude of a frequency in a compression stroke. The valve assembly may include: a main retainer coupled to the body pin and having a main chamber configured to communicate with the injection flow path; a main valve coupled to the body pin and configured to open or close the main chamber; a housing coupled to the body pin and having a pilot chamber having one side facing the main valve, and the other side communicating with the injection flow path; and a pilot valve coupled to the body pin and configured to cover the pilot chamber, the pilot valve being configured to press the housing toward the main valve while being elastically deformed when pressure in the pilot chamber is higher than a preset pressure.

The injection flow path may be provided on an outer peripheral surface of one side of the body pin and elongated in the form of a slit in a longitudinal direction of the body pin.

The pilot valve, in a low-frequency compression stroke, may press the housing toward the main valve while being elastically deformed to allow the main valve to close the main chamber, and the pilot valve, in a high-frequency compression stroke, may be restored, such that the pressure applied to the housing may be eliminated, and the main valve may be opened.

The valve assembly may further include an inlet disc interposed between the housing and the pilot valve. The inlet disc may include at least one slit formed to allow the pilot chamber and the injection flow path formed in the body pin to communicate with each other so that a working fluid is introduced into the pilot chamber.

When in a low-frequency compression stroke, a stroke of the piston rod operates to be relatively larger than that in a high-frequency compression stroke, the amount of working fluid introduced into the pilot chamber may be increased, and the pressure in the pilot chamber may be raised, and when the pressure in the pilot chamber is higher than the preset pressure, the pilot valve may press the housing toward the main valve while being elastically deformed, and the housing may push the main valve to close the main chamber.

When in a high-frequency compression stroke, a stroke of the piston rod operates to be relatively smaller than that in a low-frequency compression stroke, the amount of working fluid introduced into the pilot chamber may be decreased, and the pressure in the pilot chamber may be lowered, and when the pressure in the pilot chamber is lower than the preset pressure, the pilot valve may be restored, the pressure applied to the housing may be eliminated, and the main valve may be opened, such that the working fluid in the main chamber may flow to the compression chamber.

When impact occurs, the main valve may be opened as the housing is moved by inertia toward the pilot valve, such that a working fluid in the main chamber may flow to the reserve chamber to reduce the impact.

The valve assembly may further include a disc spring configured to elastically press the housing toward the main valve.

In at least one region in which the pilot valve faces the housing, an accumulator may be formed to maintain and mitigate the pressure in the pilot chamber.

The valve assembly may include: a washer mounted on the body pin in the other direction opposite to one direction in which the pilot valve faces the housing; and a spacer mounted on the body pin and configured to maintain an interval between the pilot valve and the housing.

When the pilot valve is elastically deformed, the pilot valve may push the washer, and a repulsive force against the force for pushing the washer may press the housing toward the main valve.

According to the embodiment of the present disclosure, the frequency-sensitive shock absorber may generate a damping force that effectively varies depending on changes in frequency and speed.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
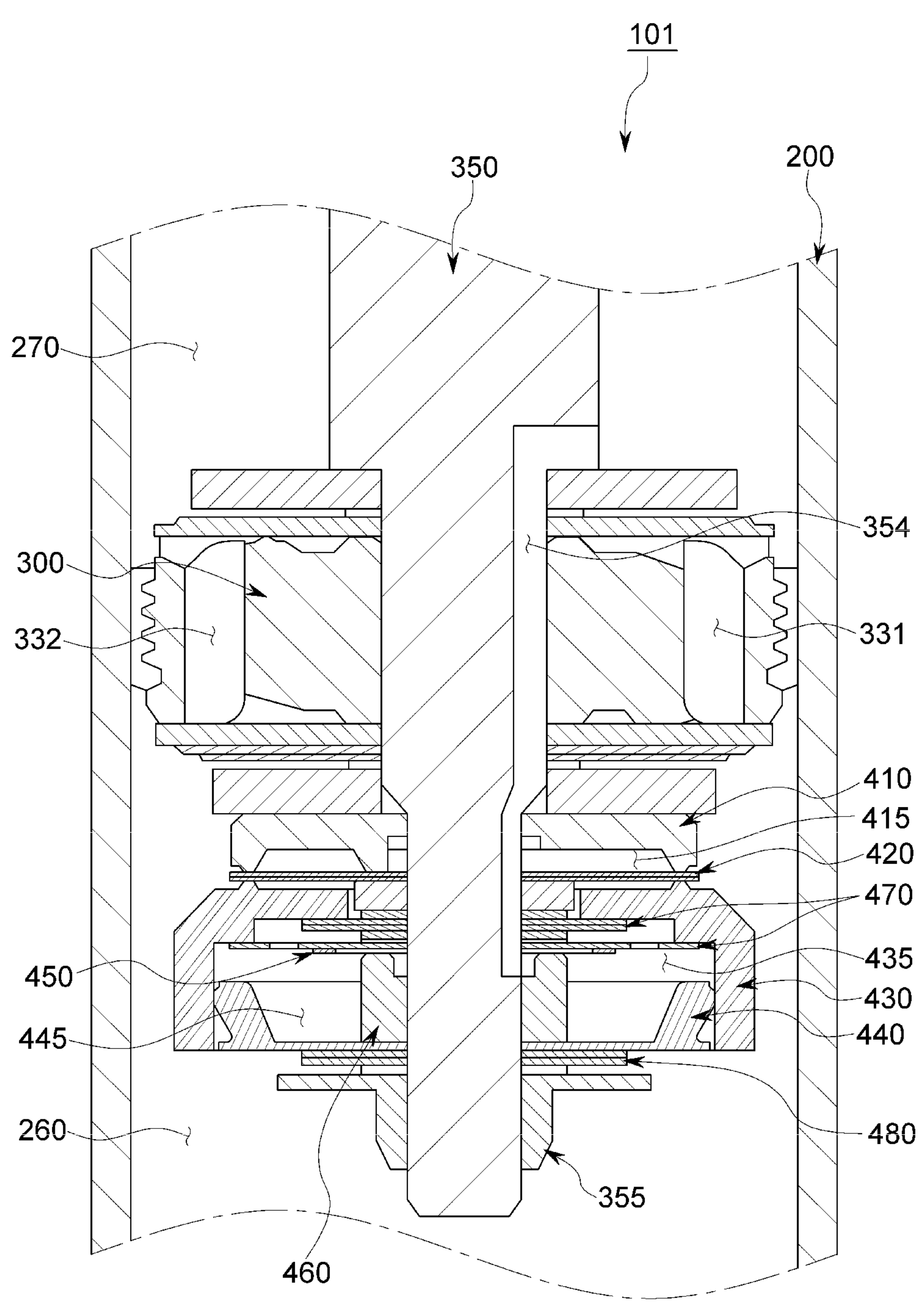
FIG. 1 is a cross-sectional view illustrating a frequency-sensitive shock absorber according to a first embodiment of the present disclosure.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, embodiments of the present disclosure will be described in detail with reference to the accompanying drawings so that those with ordinary skill in the art to which the present disclosure pertains may easily carry out the embodiments. The present disclosure may be implemented in various different ways, and is not limited to the embodiments described herein.

The constituent elements having the same configurations in several embodiments will be assigned with the same reference numerals and representatively described in a first embodiment, and only the constituent elements, which are different from the constituent elements according to the first embodiment, will be described in other embodiments.

It is noted that the drawings are schematic, and are not illustrated based on actual scales. Relative dimensions and proportions of parts illustrated in the drawings are exaggerated or reduced in size for the purpose of clarity and convenience in the drawings, and any dimension is just illustrative but not restrictive. The same reference numerals designate the same structures, elements or components illustrated in two or more drawings in order to exhibit similar characteristics.

Embodiments of the present disclosure illustrate ideal embodiments of the present disclosure in detail. As a result, various modifications of the drawings are expected. Therefore, the embodiments are not limited to specific forms in regions illustrated in the drawings, and for example, include modifications of forms by the manufacture thereof.

Unless otherwise defined, all technical and scientific terms used in the present specification have meanings generally understood by those skilled in the art to which the present disclosure pertains. All terms used in the present specification are selected for the purpose of more clearly explaining the present disclosure but not selected to restrict the scope of the present disclosure.

The expressions "include," "provided with," "have" and the like used in the present specification should be understood as open-ended terms connoting the possibility of inclusion of other embodiments unless otherwise mentioned in a phrase or sentence including the expressions.

A singular expression can include the meanings of the plurality unless otherwise mentioned, and the same applies to a singular expression stated in the claims.

The terms "first," "second," and the like used in the present specification are used to identify a plurality of constituent elements from one another and are not intended to limit the order or importance of the relevant constituent elements.

Hereinafter, a frequency-sensitive shock absorber 101 according to a first embodiment of the present disclosure will be described with reference to FIGS. 1 to 4.

The frequency-sensitive shock absorber 101 according to the first embodiment of the present disclosure is called a damper. For example, the frequency-sensitive shock absorber 101 may be installed in a vehicle and used to absorb and mitigate impact or vibration applied to an axle from a road surface while the vehicle travels.

As illustrated in FIG. 1, the frequency-sensitive shock absorber 101 according to the first embodiment of the present disclosure includes a cylinder 200, a piston rod 350, a piston valve 300, and a valve assembly 400.

The cylinder 200 may have a cylindrical shape having a space therein, and the interior of the cylinder 200 is filled with a working fluid. In this case, the interior of the cylinder 200 may be divided into a compression chamber 260 and a rebound chamber 270 by the piston valve 300 to be described below. For example, based on the piston valve 300, the rebound chamber 270 may be an upper portion of the cylinder 200, and the compression chamber 260 may be a lower portion of the cylinder 200.

The piston rod 350 may reciprocate in the cylinder 200. For example, one side of the piston rod 350 may be positioned in the cylinder 200, and the other side of the piston rod 350 may extend to the outside of the cylinder 200 and be connected to a vehicle body or a vehicle wheel of the vehicle. Further, the piston valve 300 to be described below is mounted at one side of the piston rod 350.

A piston nut 355 may be coupled to one end of the piston rod 350 that protrudes while penetrating the piston valve 300 and the valve assembly 400 that will be described below. That is, the piston nut 355 may prevent the piston valve 300 and the valve assembly 400 from separating from the piston rod 350.

In the first embodiment of the present disclosure, an injection flow path 354 is formed in the piston rod 350 and communicates with the rebound chamber 270. The injection flow path 354 may be provided on an outer peripheral surface of one side of the piston rod 350 and elongated in the form of a slit in a longitudinal direction of the piston rod 350.

The piston valve 300 may be mounted and supported at one side of the piston rod 350. Specifically, the piston valve 300 may be provided to reciprocate in the cylinder 200, which is filled with the working fluid, together with the piston rod 350 in a state in which the piston rod 350 is penetratively coupled to the piston valve 300.

As described above, the piston valve 300 may divide the cylinder 200 into the compression chamber 260 and the rebound chamber 270. The piston valve 300 may include a plurality of compression flow paths 331 and a plurality of extension flow paths 332 penetratively formed in a direction in which the plurality of compression flow paths 331 and the plurality of extension flow paths 332 connect the compression chamber 260 and the rebound chamber 370 in order to move the working fluid in a compression stroke and an extension stroke.

The piston valve 300 generates a damping force made by a resistive force of the working fluid while moving in the cylinder 200 in directions of the compression stroke or the extension stroke direction.

Specifically, for example, in case that the piston valve 300 performs the compression stroke, pressure in the compression chamber 260 is raised to be relatively higher than pressure in the rebound chamber 270. The increase in pressure in the compression chamber 260 allows the working fluid stored in the compression chamber 260 to flow to the rebound chamber 270 through the compression flow path 331 of the piston valve 300.

On the contrary, in case that the piston valve 300 performs the extension stroke, pressure in the rebound chamber 270 is raised to be relatively higher than pressure in the compression chamber 260. The increase in pressure in the rebound chamber 270 allows the working fluid stored in the rebound chamber 270 to flow to the compression chamber 260 through the extension flow path 332 of the piston valve 300.

In the first embodiment of the present disclosure, the valve assembly 400 may be mounted on the piston rod 350 and generate a damping force that varies depending on a magnitude of a frequency in the extension stroke.

For example, the valve assembly 400 may be mounted on the piston rod 350 so as to be disposed adjacent to one surface of the piston valve 300 that faces the compression chamber 260. Further, the valve assembly 400 serves to generate a damping force that varies depending on a frequency in the extension stroke.

Specifically, the valve assembly 400 may include a main retainer 410, a main valve 420, a housing 430, and a pilot valve 440.

The valve assembly 400 may further include an inlet disc 450, a disc spring 470, a washer 480, and a spacer 460.

The main retainer 410 is coupled to the piston rod 350. Further, the main retainer 410 may have a main chamber 415 formed to communicate with the injection flow path 354. Specifically, one side surface of the main retainer 410 may face the piston valve 300, and the main chamber 415 may be formed on the other side surface of the main retainer 410. That is, a portion of the other side surface of the main retainer 410, which faces the housing 430 to be described below, may be opened, and the main chamber 415 may be formed in the opened portion.

The main valve 420 may be coupled to the piston rod 350 and open or close the main chamber 415. That is, the main valve 420 may open or close the main chamber 415 while coming into contact with or separating from the other side surface of the main retainer 410.

The housing 430 may be coupled to the piston rod 350 and have a pilot chamber 435 having one side facing the main valve 420, and the other side communicating with the injection flow path 354. That is, a portion of the other side of the housing 430, which faces the pilot valve 440 to be described below, is opened, and the pilot chamber 435 may be formed in the opened portion. Further, one side surface of the housing 430, which faces the main valve 420, may press the main valve 420 to allow the main valve 420 to close the main chamber 415 in response to an operation of the pilot valve 440 to be described below.

The pilot valve 440 is coupled to the piston rod 350 and covers the pilot chamber 435. When the pressure in the pilot chamber 435 becomes higher than a preset pressure, the pilot valve 440 presses the housing 430 toward the main valve 420 while being elastically deformed. In this case, the preset pressure may be variously set in accordance with the performance required for the frequency-sensitive shock absorber 101.

Specifically, in the first embodiment of the present disclosure, when the pressure in the pilot chamber 435 is raised in a low-frequency extension stroke, the pilot valve 440 presses the housing 430 toward the main valve 420 while being elastically deformed. When the housing 430 presses the main valve 420, the main valve 420 is operated, by the force, to close the main chamber 415. In contrast, the elastically deformed pilot valve 440 is restored to an original shape as the pressure in the pilot chamber 435 is lowered in a high-frequency extension stroke. In this case, the pressure applied to the housing 430 is eliminated. Therefore, the main valve 420 may be opened, and the working fluid in the main chamber 415 may flow to the compression chamber 260.

In at least one region in which the pilot valve 440 faces the housing 430, an accumulator 445 may be formed to maintain and mitigate the pressure in the pilot chamber 435.

The inlet disc 450 may be interposed between the housing 430 and the pilot valve 440.

Figure 2:
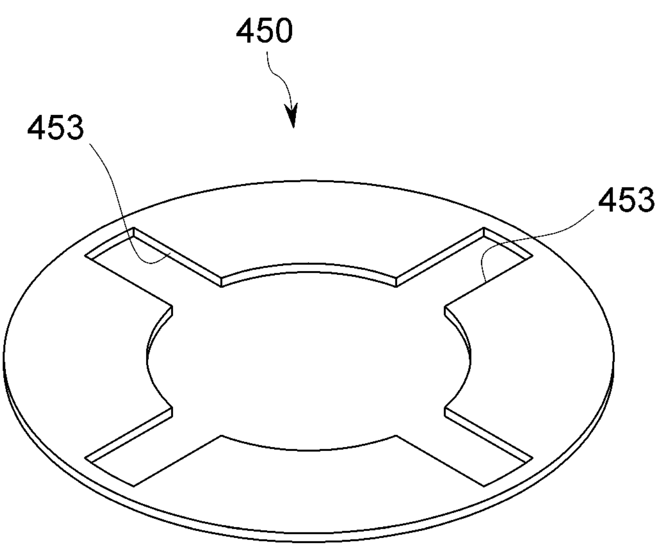
FIG. 2 is a perspective view illustrating an inlet disc used for the frequency-sensitive shock absorber in FIG. 1.

Specifically, as illustrated in FIG. 2, the inlet disc 450 may include at least one slit 453 formed to allow the pilot chamber 435 to communicate with the injection flow path 354 formed in the piston rod 350 so that the working fluid may be introduced into the pilot chamber 435. The slit 453 may be formed from a hollow portion of the inlet disc 450, which is penetrated by the piston rod 350, to a position at which the slit 453 communicates with the pilot chamber 435. Therefore, the injection flow path 354 and the pilot chamber 435 may communicate with each other through the slit 453. Further, the amount of working fluid introduced into the pilot chamber 435 may be adjusted by adjusting the number of slits 453 and the size of the slit 453.

The disc spring 470 may elastically press the housing 430 toward the main valve 420. That is, in a state in which no pressure is applied to the pilot chamber 435, the housing 300 is brought into contact with the main valve 420 by the disc spring 470, and the main valve 420 is kept in contact with the main retainer 410.

The washer 480 may be mounted on the piston rod 350 in the other direction opposite to one direction in which the pilot valve 440 faces the housing 430.

The spacer 460 may be mounted on the piston rod 350 and maintain an interval between the pilot valve 440 and the housing 430.

With the above-mentioned structure, the pilot valve 440 is elastically deformed by the increase in pressure in the pilot chamber 435, and the pilot valve 440 pushes the washer 480, such that the repulsive force against the force for pushing the washer 480 presses the housing 430 toward the main valve 420.

Hereinafter, an operating state of the frequency-sensitive shock absorber 101 according to the first embodiment of the present disclosure will be described in detail with reference to FIGS. 3 and 4.

Figure 3:
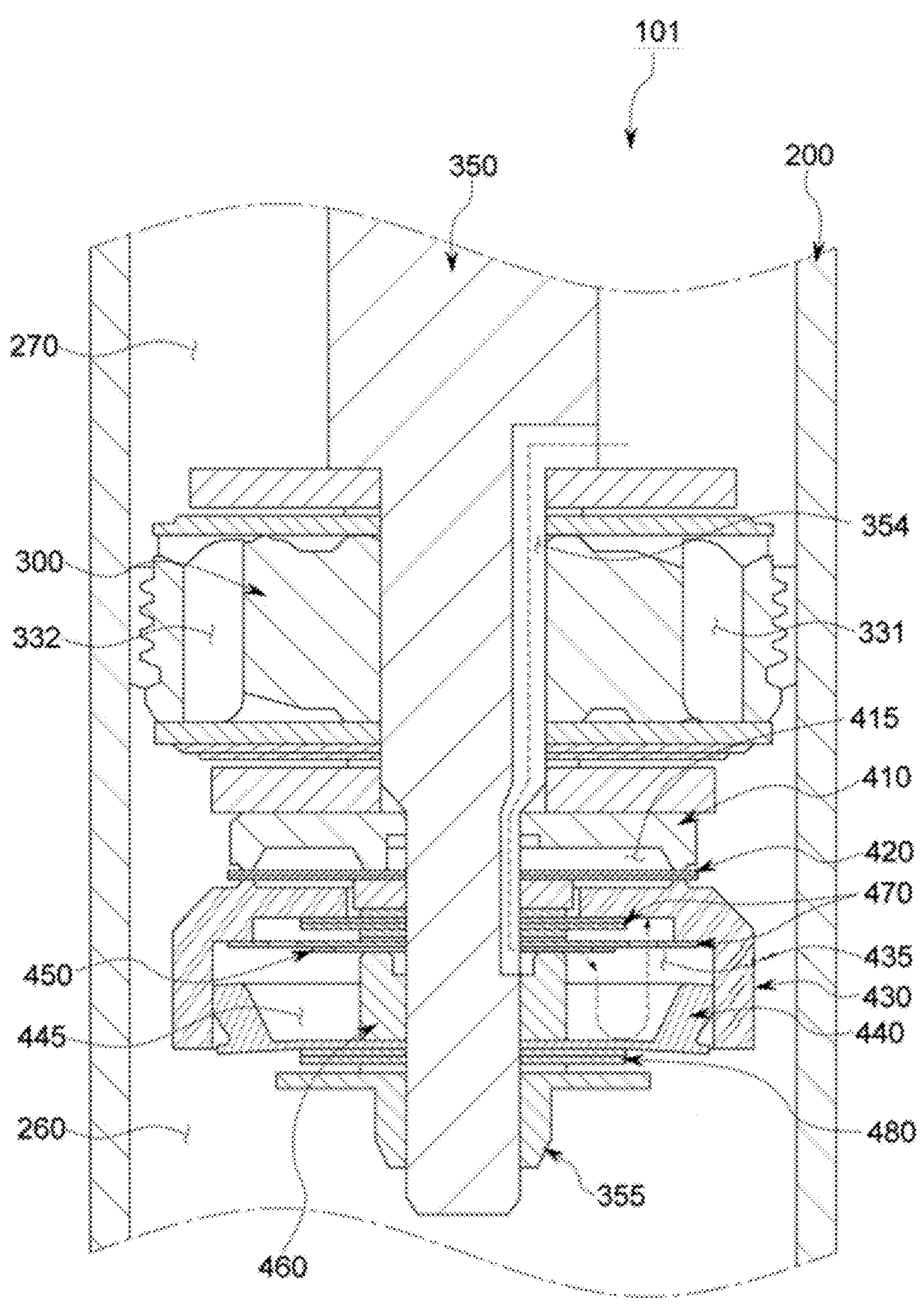
FIGS. 3 and 4 are cross-sectional views for explaining operating states of the frequency-sensitive shock absorber in FIG. 1.

First, as illustrated in FIG. 3, in the low-frequency extension stroke, the stroke of the piston rod 350 operates to be relatively larger than that in the high-frequency extension stroke, such that the amount of working fluid introduced into the pilot chamber 435 through the inlet disc 450 is increased, and the pressure in the pilot chamber 435 is raised.

When the pressure in the pilot chamber 435 becomes higher than the preset pressure, the pilot valve 440 presses the housing 430 toward the main valve 420 while being elastically deformed, such that the housing 430 pushes the main valve 420 and closes the main chamber 415.

That is, in the low-frequency extension stroke, the working fluid flows from the rebound chamber 270 to the compression chamber 260 only through the extension flow path 332 of the piston valve 300 but cannot flow to the injection flow path 354 and the main chamber 415.

Therefore, the frequency-sensitive shock absorber 101 generates a relatively high damping force in the low-frequency extension stroke.

Figure 4:
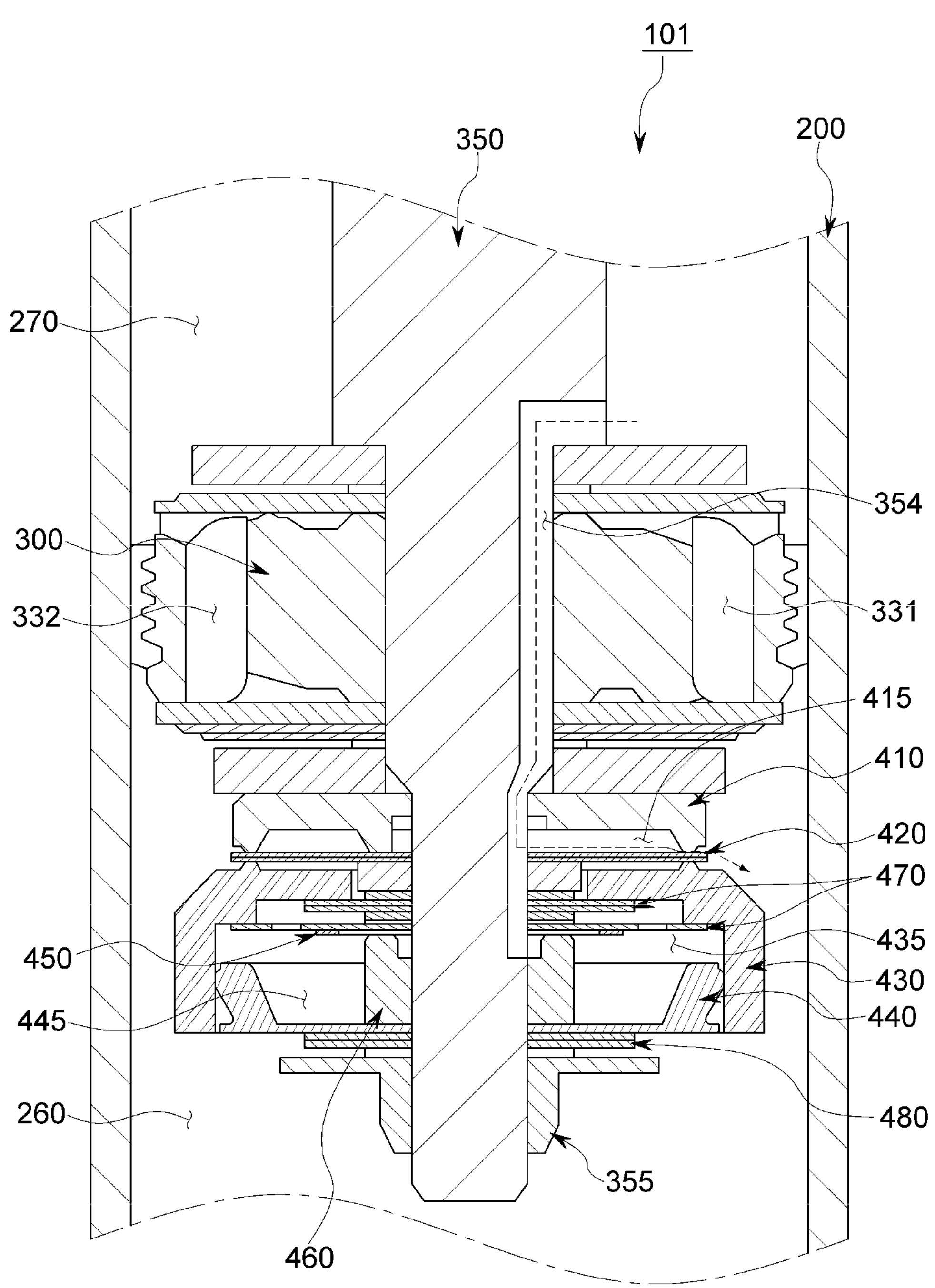

Next, as illustrated in FIG. 4, in the high-frequency extension stroke, the stroke of the piston rod 350 operates to be relatively smaller than that in the low-frequency extension stroke, such that the amount of working fluid introduced into the pilot chamber 435 through the inlet disc 450 is decreased, and the pressure in the pilot chamber 435 is lowered.

When the pressure in the pilot chamber 435 becomes lower than the preset pressure, the elastically deformed pilot valve 440 is restored, and the pressure applied to the housing 430 is eliminated. Therefore, the main valve 420, which is not pushed by the housing 430, may be opened, and the working fluid in the main chamber 415 may flow to the compression chamber 260.

That is, in the high-frequency extension stroke, the working fluid may flow from the rebound chamber 270 to the compression chamber 260 through a bypass flow path defined by the injection flow path 354 and the main chamber 415 together with the extension flow path 332 of the piston valve 300. As described above, in the high-frequency extension stroke, the injection flow path 354 and the main chamber 415 define the bypass flow path through which the working fluid may flow from the rebound chamber 270 to the compression chamber 260.

Therefore, the frequency-sensitive shock absorber 101 generates a relatively low damping force in the high-frequency extension stroke.

The frequency-sensitive shock absorber 101 may prevent deterioration in adjustment stability by preventing deterioration in damping force in a low-speed section in the low-frequency extension stroke and improve ride quality by generating performance in varying the damping force depending on the frequency in middle and high-speed sections.

Meanwhile, when impact occurs, the main valve 420 is opened as the housing 430 is moved by inertia toward the pilot valve 440, such that the working fluid in the main chamber 415 flows to the compression chamber 260, thereby reducing impact. That is, when impact occurs, the frequency-sensitive shock absorber 101 reduces the impact by instantaneously defining the bypass flow path and allowing the working fluid to pass through the bypass flow path.

With the above-mentioned configuration, the frequency-sensitive shock absorber 101 according to the first embodiment of the present disclosure may generate the damping force that effectively varies depending on the changes in frequency and speed.

Specifically, the frequency-sensitive shock absorber adjusts the amount of working fluid, which passes through the injection flow path 354 and is introduced into the pilot chamber 435 and the main chamber 415 in the extension stroke, which makes it possible to implement the similar damping forces at the time of the low and high frequencies in the low-speed section and satisfy both ride quality and adjustment stability of the vehicle by varying the damping force depending on the low and high frequencies in the middle and high-speed sections.

It is possible to effectively reduce impact even though the impact occurs.

Hereinafter, a second embodiment of the present disclosure will be described with reference to FIGS. 5 to 7.

A frequency-sensitive shock absorber 102 according to the second embodiment of the present disclosure may also be installed in a vehicle and used to absorb and mitigate impact or vibration applied to an axle from a road surface while the vehicle travels.

Figure 5:
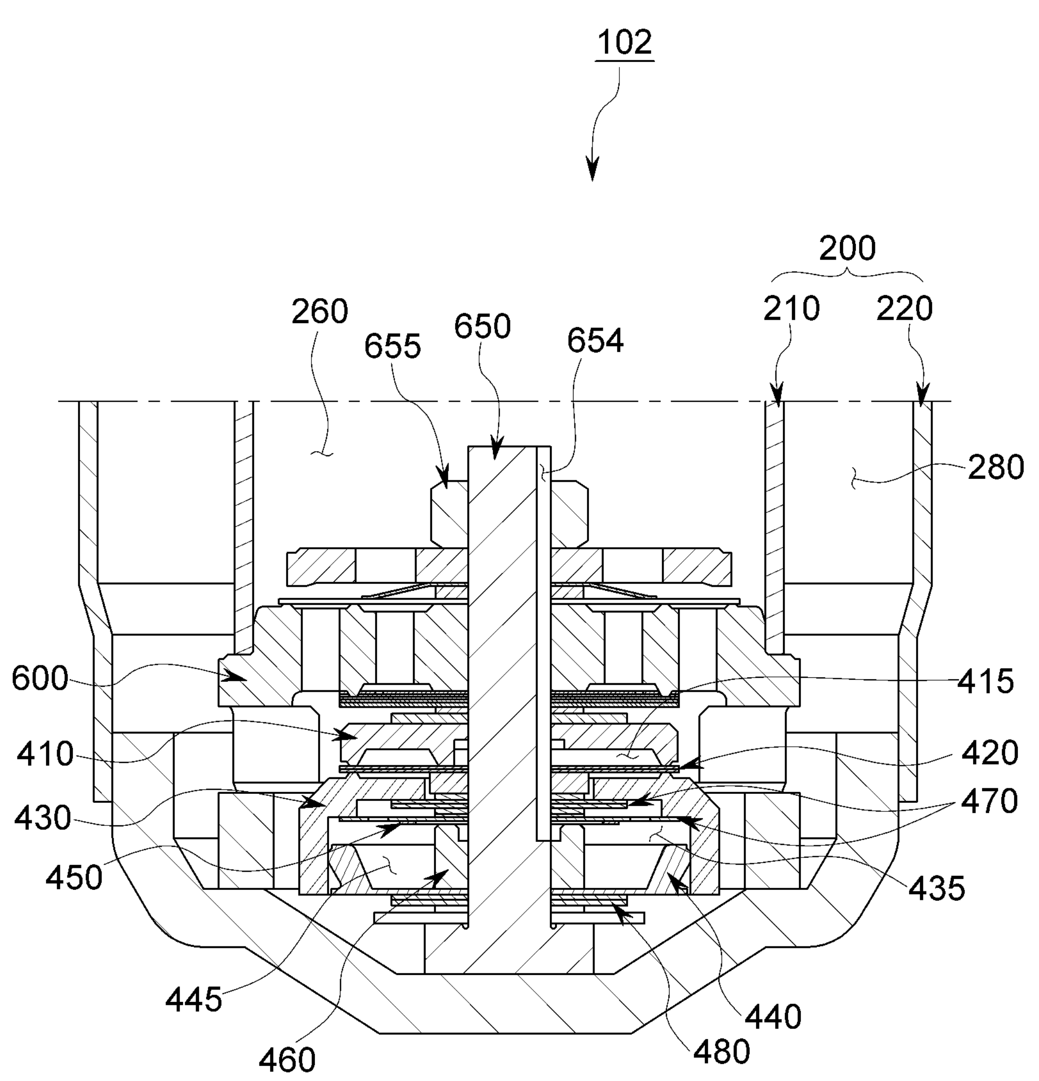
FIG. 5 is a cross-sectional view illustrating a frequency-sensitive shock absorber according to a second embodiment of the present disclosure.

As illustrated in FIG. 5, the frequency-sensitive shock absorber 102 according to the second embodiment of the present disclosure includes the cylinder 200, the piston rod 350, the piston valve 300, a body valve 600, a body pin 650, and the valve assembly 400.

Meanwhile, FIG. 5 does not illustrate the piston rod 350 and the piston valve 300. However, the piston rod 350 and the piston valve 300 may be identical to those previously described in the first embodiment. That is, the piston rod 350 and the piston valve 300 may be identical to the structures previously illustrated in FIG. 1, except for the valve assembly 400.

The cylinder 200 may have a cylindrical shape having a space therein, and the interior of the cylinder 200 is filled with a working fluid. Further, the cylinder 200 may include a first cylinder 210 and a second cylinder 220.

The piston valve 300 to be described below may be disposed in the first cylinder 210 and configured to be movable upward or downward. The interior of the first cylinder 210 may be divided into the compression chamber 260 and the rebound chamber 270 by the piston valve 300. For example, based on the piston valve 300, the rebound chamber 270 may be an upper portion of the cylinder 200, and the compression chamber 260 may be a lower portion of the cylinder 200.

The second cylinder 220 may surround the first cylinder 210 with a separation space interposed therebetween and define a reserve chamber 280 between the second cylinder 220 and the first cylinder 210.

The piston rod 350 may reciprocate in the first cylinder 210. Further, the piston valve 300 to be described below is mounted at one side of the piston rod 350.

The piston valve 300 may divide the interior of the first cylinder 210 into the compression chamber 260 and the rebound chamber 270.

The body valve 600 may be installed at an end of the compression chamber 360 of the first cylinder 210 and adjust the flow of the working fluid between the compression chamber 360 and the reserve chamber 280. That is, a flow path may be formed in the body valve 600 so that the fluid may flow between the compression chamber 260 and the reserve chamber 280.

Therefore, in the compression stroke, the fluid in the compression chamber 260 may flow to the rebound chamber 270 through the piston valve 300 or flow to the reserve chamber 280 through the body valve 600, thereby generating the damping force against impact or vibration.

The body pin 650 may be fastened while penetrating the body valve 600 and the valve assembly 400 to be described below.

A body nut 655 may be coupled to one end of the body pin 650 that protrudes while penetrating the body valve 600 and the valve assembly 400 to be described below. That is, the body nut 655 may prevent the body valve 600 and the valve assembly 400 from separating from the body pin 650.

In the second embodiment of the present disclosure, an injection flow path 654 is formed in the body pin 650 and communicates with the compression chamber 260. The injection flow path 654 may be provided on an outer peripheral surface of one side of the body pin 650 and elongated in the form of a slit in the longitudinal direction of the body pin 650.

In the second embodiment of the present disclosure, the valve assembly 400 may be mounted on the body pin 650 and generate a damping force that varies depending on a magnitude of a frequency in the compression stroke.

For example, the valve assembly 400 may be mounted on the body pin 650 so as to be disposed adjacent to the other surface opposite to one surface of the body valve 600 that faces the compression chamber 260. Further, the valve assembly 400 serves to generate a damping force that varies depending on a frequency in the compression stroke.

Specifically, the valve assembly 400 may include the main retainer 410, the main valve 420, the housing 430, and the pilot valve 440.

The valve assembly 400 may further include the inlet disc 450, the disc spring 470, the washer 480, and the spacer 460.

The main retainer 410 is coupled to the body pin 650. Further, the main retainer 410 may have the main chamber 415 formed to communicate with the injection flow path 654. Specifically, one side surface of the main retainer 410 may face the body valve 600, and the main chamber 415 may be formed on the other side surface of the main retainer 410. That is, a portion of the other side surface of the main retainer 410, which faces the housing 430 to be described below, may be opened, and the main chamber 415 may be formed in the opened portion.

The main valve 420 may be coupled to the body pin 650 and open or close the main chamber 415. That is, the main valve 420 may open or close the main chamber 415 while coming into contact with or separating from the other side surface of the main retainer 410.

The housing 430 may be coupled to the body pin 650 and have the pilot chamber 435 having one side facing the main valve 420, and the other side communicating with the injection flow path 654. That is, a portion of the other side of the housing 430, which faces the pilot valve 440 to be described below, is opened, and the pilot chamber 435 may be formed in the opened portion. Further, one side surface of the housing 430, which faces the main valve 420, may press the main valve 420 to allow the main valve 420 to close the main chamber 415 in response to an operation of the pilot valve 440 to be described below.

The pilot valve 440 is coupled to the body pin 650 and covers the pilot chamber 435. When the pressure in the pilot chamber 435 becomes higher than a preset pressure, the pilot valve 440 presses the housing 430 toward the main valve 420 while being elastically deformed. In this case, the preset pressure may be variously set in accordance with the performance required for the frequency-sensitive shock absorber 102.

Specifically, in the second embodiment of the present disclosure, when the pressure in the pilot chamber 435 is raised in a low-frequency compression stroke, the pilot valve 440 presses the housing 430 toward the main valve 420 while being elastically deformed. When the housing 430 presses the main valve 420, the main valve 420 is operated, by the force, to close the main chamber 415. In contrast, the elastically deformed pilot valve 440 is restored to an original shape as the pressure in the pilot chamber 435 is lowered in a high-frequency compression stroke. In this case, the pressure applied to the housing 430 is eliminated. Therefore, the main valve 420 may be opened, and the working fluid in the main chamber 415 may flow to the reserve chamber 280.

In at least one region in which the pilot valve 440 faces the housing 430, the accumulator 445 may be formed to maintain and mitigate the pressure in the pilot chamber 435.

The inlet disc 450 may be interposed between the housing 430 and the pilot valve 440.

Specifically, as previously illustrated in FIG. 2, the inlet disc 450 may include at least one slit 453 formed to allow the pilot chamber 435 to communicate with the injection flow path 654 formed in the body pin 650 so that the working fluid may be introduced into the pilot chamber 435. The slit 453 may be formed from a hollow portion of the inlet disc 450, which is penetrated by the body pin 650, to a position at which the slit 453 communicates with the pilot chamber 435. Therefore, the injection flow path 654 and the pilot chamber 435 may communicate with each other through the slit 453. Further, the amount of working fluid introduced into the pilot chamber 435 may be adjusted by adjusting the number of slits 453 and the size of the slit 453.

The disc spring 470 may elastically press the housing 430 toward the main valve 420. That is, in a state in which no pressure is applied to the pilot chamber 435, the housing 300 is brought into contact with the main valve 420 by the disc spring 470, and the main valve 420 is kept in contact with the main retainer 410.

The washer 480 may be mounted on the body pin 650 in the other direction opposite to one direction in which the pilot valve 440 faces the housing 430.

The spacer 460 may be mounted on the body pin 650 and maintain an interval between the pilot valve 440 and the housing 430.

With the above-mentioned structure, the pilot valve 440 is elastically deformed by the increase in pressure in the pilot chamber 435, and the pilot valve 440 pushes the washer 480, such that the repulsive force against the force for pushing the washer 480 presses the housing 430 toward the main valve 420.

Hereinafter, an operating state of the frequency-sensitive shock absorber 102 according to the second embodiment of the present disclosure will be described in detail with reference to FIGS. 6 and 7.

Figure 6:
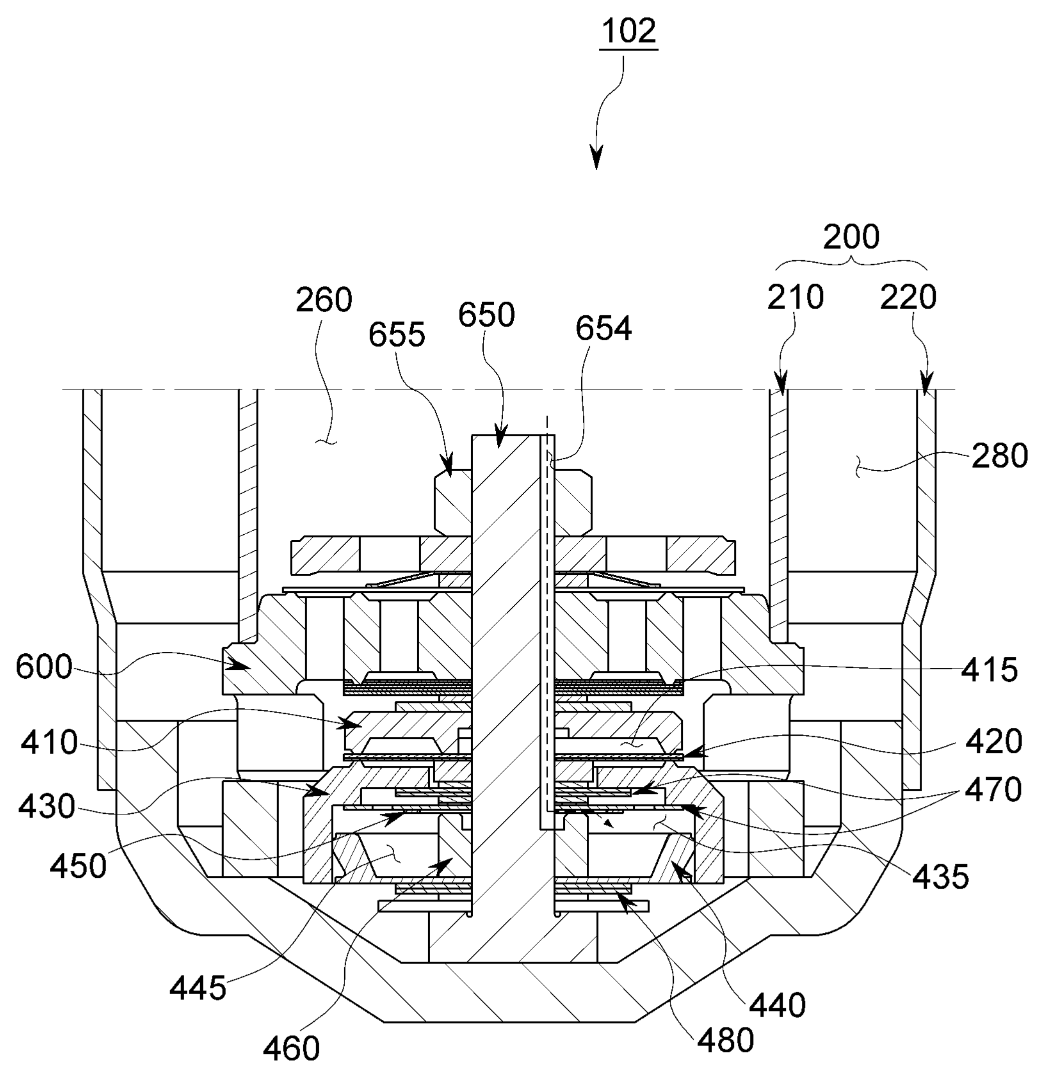
FIGS. 6 and 7 are cross-sectional views for explaining operating states of the frequency-sensitive shock absorber in FIG. 1.

First, as illustrated in FIG. 6, in the low-frequency compression stroke, the stroke of the piston rod 350 operates to be relatively larger than that in the high-frequency extension stroke, such that the amount of working fluid introduced into the pilot chamber 435 through the inlet disc 450 is increased, and the pressure in the pilot chamber 435 is raised.

When the pressure in the pilot chamber 435 becomes higher than the preset pressure, the pilot valve 440 presses the housing 430 toward the main valve 420 while being elastically deformed, such that the housing 430 pushes the main valve 420 and closes the main chamber 415.

That is, in the low-frequency compression stroke, the working fluid flows from the compression chamber 260 to the reserve chamber 280 only through the body valve 600 but cannot flow to the injection flow path 654 and the main chamber 415.

Therefore, the frequency-sensitive shock absorber 102 generates a relatively high damping force in the low-frequency compression stroke.

Figure 7:
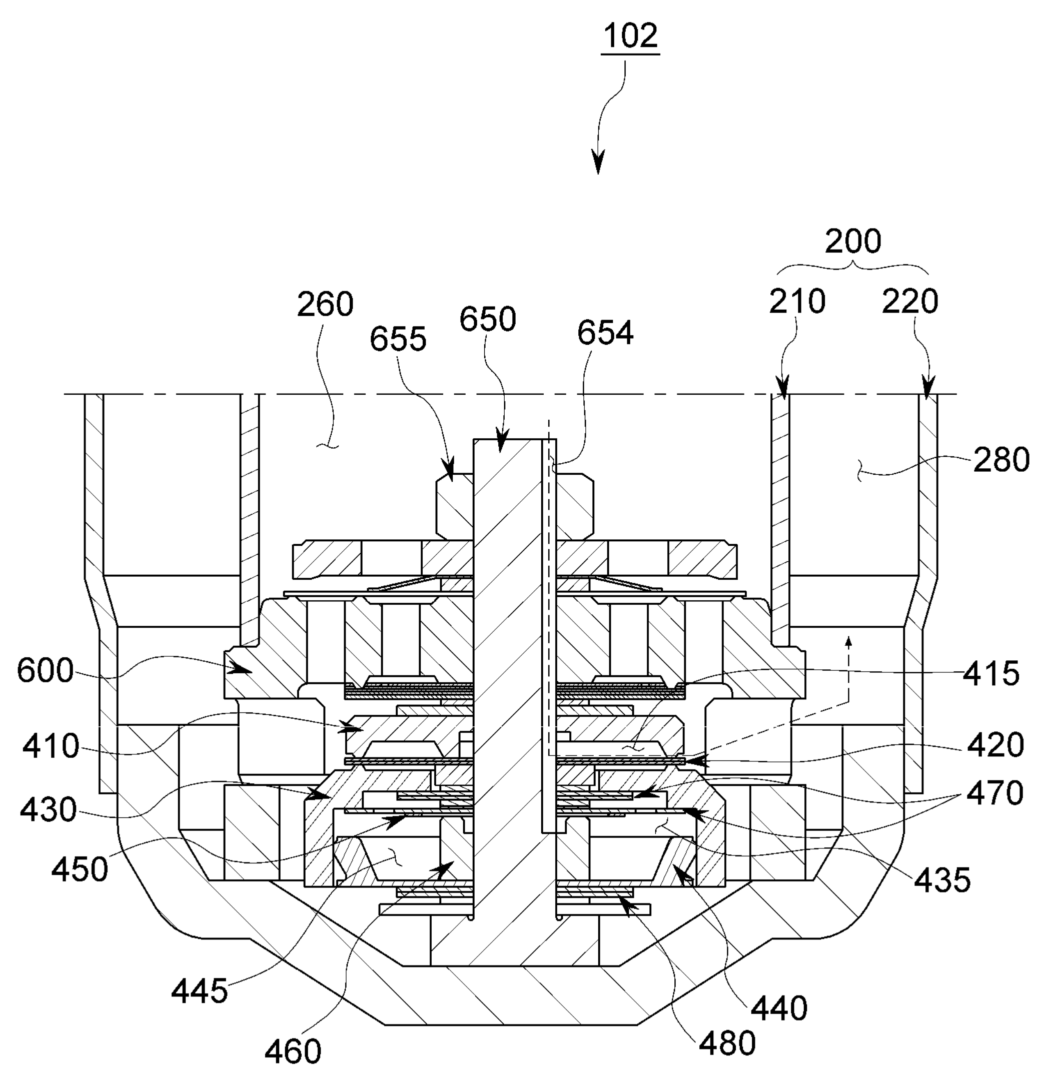

Next, as illustrated in FIG. 7, in the high-frequency compression stroke, the stroke of the piston rod 350 operates to be relatively smaller than that in the low-frequency extension stroke, such that the amount of working fluid introduced into the pilot chamber 435 through the inlet disc 450 is decreased, and the pressure in the pilot chamber 435 is lowered.

When the pressure in the pilot chamber 435 becomes lower than the preset pressure, the elastically deformed pilot valve 440 is restored, and the pressure applied to the housing 430 is eliminated. Therefore, the main valve 420, which is not pushed by the housing 430, may be opened, and the working fluid in the main chamber 415 may flow to the reserve chamber 280.

That is, in the high-frequency compression stroke, the working fluid may flow from the compression chamber 260 to the reserve chamber 280 through a bypass flow path defined by the injection flow path 654 and the main chamber 415 together with the body valve 600. As described above, in the high-frequency compression stroke, the injection flow path 654 and the main chamber 415 define the bypass flow path through which the working fluid may flow from the compression chamber 260 to the reserve chamber 280.

Therefore, the frequency-sensitive shock absorber 102 generates a relatively low damping force in the high-frequency compression stroke.

The frequency-sensitive shock absorber 102 may prevent deterioration in adjustment stability by preventing deterioration in damping force in a low-speed section in the low-frequency compression stroke and improve ride quality by generating performance in varying the damping force depending on the frequency in middle and high-speed sections.

Meanwhile, when impact occurs, the main valve 420 is opened as the housing 430 is moved by inertia toward the pilot valve 440, such that the working fluid in the main chamber 415 flows to the reserve chamber 280, thereby reducing impact. That is, when impact occurs, the frequency-sensitive shock absorber 102 reduces the impact by instantaneously defining the bypass flow path and allowing the working fluid to pass through the bypass flow path.

With the above-mentioned configuration, the frequency-sensitive shock absorber 102 according to the second embodiment of the present disclosure may also generate the damping force that effectively varies depending on the changes in frequency and speed.

Specifically, the frequency-sensitive shock absorber adjusts the amount of working fluid, which passes through the injection flow path 654 and is introduced into the pilot chamber 435 and the main chamber 415 in the compression stroke, which makes it possible to implement the similar damping forces at the time of the low and high frequencies in the low-speed section and satisfy both ride quality and adjustment stability of the vehicle by varying the damping force depending on the low and high frequencies in the middle and high-speed sections.

It is possible to effectively reduce impact even though the impact occurs.

Hereinafter, a third embodiment of the present disclosure will be described.

The above-mentioned frequency-sensitive shock absorbers according to the first and second embodiments may be applied as the frequency-sensitive shock absorber according to the third embodiment of the present disclosure.

That is, the valve assemblies 400 may be respectively mounted on the piston rod 350 and the body pin 650.

Therefore, the frequency-sensitive shock absorber adjusts the amount of working fluid, which is introduced into the pilot chamber 435 and the main chamber 415 in the extension stroke and the compression stroke, which makes it possible to implement the similar damping forces at the time of the low and high frequencies in the low-speed section and satisfy both ride quality and adjustment stability of the vehicle by varying the damping force depending on the low and high frequencies in the middle and high-speed sections.

While the embodiments of the present disclosure have been described with reference to the accompanying drawings, those skilled in the art will understand that the present disclosure may be carried out in any other specific form without changing the technical spirit or an essential feature thereof.

Accordingly, it should be understood that the aforementioned embodiments are described for illustration in all aspects and are not limited, and the scope of the present disclosure shall be represented by the claims to be described below, and it should be construed that all of the changes or modified forms induced from the meaning and the scope of the claims, and an equivalent concept thereto are included in the scope of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A frequency-sensitive shock absorber comprising:

a piston rod configured to reciprocate in a cylinder and having an injection flow path;

a piston valve mounted on the piston rod and configured to divide the cylinder into a compression chamber and a rebound chamber; and a valve assembly mounted on the piston rod and configured to generate a damping force that varies depending on a magnitude of a frequency in an extension stroke, wherein the valve assembly comprises:

a main retainer coupled to the piston rod and having a main chamber configured to communicate with the injection flow path;

a main valve coupled to the piston rod and configured to open or close the main chamber;

a housing coupled to the piston rod and having a pilot chamber having one side facing the main valve, and the other side communicating with the injection flow path; and a pilot valve coupled to the piston rod and configured to cover the pilot chamber, the pilot valve being configured to press the housing toward the main valve while being elastically deformed when pressure in the pilot chamber is higher than a preset pressure.

2. The frequency-sensitive shock absorber of claim 1, wherein the injection flow path is provided on an outer peripheral surface of one side of the piston rod and elongated in the form of a slit in a longitudinal direction of the piston rod.

3. The frequency-sensitive shock absorber of claim 1, wherein the pilot valve, in a low-frequency extension stroke, presses the housing toward the main valve while being elastically deformed to allow the main valve to close the main chamber, and wherein the pilot valve, in a high-frequency extension stroke, is restored, such that the pressure applied to the housing is eliminated, and the main valve is opened.

4. The frequency-sensitive shock absorber of claim 1, wherein the valve assembly further comprises an inlet disc interposed between the housing and the pilot valve, and the inlet disc comprises at least one slit formed to allow the pilot chamber and the injection flow path formed in the piston rod to communicate with each other so that a working fluid is introduced into the pilot chamber.

5. The frequency-sensitive shock absorber of claim 1, wherein when in a low-frequency extension stroke, a stroke of the piston rod operates to be relatively larger than that in a high-frequency extension stroke, the amount of working fluid introduced into the pilot chamber is increased, and the pressure in the pilot chamber is raised, and wherein when the pressure in the pilot chamber is higher than the preset pressure, the pilot valve presses the housing toward the main valve while being elastically deformed, and the housing pushes the main valve to close the main chamber.

6. The frequency-sensitive shock absorber of claim 1, wherein when in a high-frequency extension stroke, a stroke of the piston rod operates to be relatively smaller than that in a low-frequency extension stroke, the amount of working fluid introduced into the pilot chamber is decreased, and the pressure in the pilot chamber is lowered, and wherein when the pressure in the pilot chamber is lower than the preset pressure, the pilot valve is restored, the pressure applied to the housing is eliminated, and the main valve is opened, such that the working fluid in the main chamber flows to the compression chamber.

7. The frequency-sensitive shock absorber of claim 1, wherein when impact occurs, the main valve is opened as the housing is moved by inertia toward the pilot valve, such that a working fluid in the main chamber flows to the compression chamber to reduce the impact.

8. The frequency-sensitive shock absorber of claim 1, wherein the valve assembly further comprises a disc spring configured to elastically press the housing toward the main valve.

9. The frequency-sensitive shock absorber of claim 1, wherein in at least one region in which the pilot valve faces the housing, an accumulator is formed to maintain and mitigate the pressure in the pilot chamber.

10. The frequency-sensitive shock absorber of claim 1, wherein the valve assembly comprises:

a washer mounted on the piston rod in the other direction opposite to one direction in which the pilot valve faces the housing; and a spacer mounted on the piston rod and configured to maintain an interval between the pilot valve and the housing, and wherein when the pilot valve is elastically deformed, the pilot valve pushes the washer, and a repulsive force against the force for pushing the washer presses the housing toward the main valve.

11. A frequency-sensitive shock absorber comprising:

a first cylinder divided into a compression chamber and a rebound chamber by a piston rod, which reciprocates in the first cylinder, and a piston valve mounted on the piston rod;

a second cylinder configured to surround the first cylinder to define a reserve chamber between the first cylinder and the second cylinder;

a body valve installed at an end of the compression chamber of the first cylinder and configured to adjust a flow of a working fluid between the compression chamber and the reserve chamber;

a body pin fastened to penetrate the body valve and having an injection flow path configured to communicate with the compression chamber; and a valve assembly mounted on the body pin and configured to generate a damping force that varies depending on a magnitude of a frequency in a compression stroke, wherein the valve assembly comprises:

a main retainer coupled to the body pin and having a main chamber configured to communicate with the injection flow path;

a main valve coupled to the body pin and configured to open or close the main chamber;

a housing coupled to the body pin and having a pilot chamber having one side facing the main valve, and the other side communicating with the injection flow path; and a pilot valve coupled to the body pin and configured to cover the pilot chamber, the pilot valve being configured to press the housing toward the main valve while being elastically deformed when pressure in the pilot chamber is higher than a preset pressure.

12. The frequency-sensitive shock absorber of claim 11, wherein the injection flow path is provided on an outer peripheral surface of one side of the body pin and elongated in the form of a slit in a longitudinal direction of the body pin.

13. The frequency-sensitive shock absorber of claim 11, wherein the pilot valve, in a low-frequency compression stroke, presses the housing toward the main valve while being elastically deformed to allow the main valve to close the main chamber, and wherein the pilot valve, in a high-frequency compression stroke, is restored, such that the pressure applied to the housing is eliminated, and the main valve is opened.

14. The frequency-sensitive shock absorber of claim 11, wherein the valve assembly further comprises an inlet disc interposed between the housing and the pilot valve, and the inlet disc comprises at least one slit formed to allow the pilot chamber and the injection flow path formed in the body pin to communicate with each other so that a working fluid is introduced into the pilot chamber.

15. The frequency-sensitive shock absorber of claim 11, wherein when in a low-frequency compression stroke, a stroke of the piston rod operates to be relatively larger than that in a high-frequency compression stroke, the amount of working fluid introduced into the pilot chamber is increased, and the pressure in the pilot chamber is raised, and wherein when the pressure in the pilot chamber is higher than the preset pressure, the pilot valve presses the housing toward the main valve while being elastically deformed, and the housing pushes the main valve to close the main chamber.

16. The frequency-sensitive shock absorber of claim 11, wherein when in a high-frequency compression stroke, a stroke of the piston rod operates to be relatively smaller than that in a low-frequency compression stroke, the amount of working fluid introduced into the pilot chamber is decreased, and the pressure in the pilot chamber is lowered, and wherein when the pressure in the pilot chamber is lower than the preset pressure, the pilot valve is restored, the pressure applied to the housing is eliminated, and the main valve is opened, such that the working fluid in the main chamber flows to the compression chamber.

17. The frequency-sensitive shock absorber of claim 11, wherein when impact occurs, the main valve is opened as the housing is moved by inertia toward the pilot valve, such that a working fluid in the main chamber flows to the reserve chamber to reduce the impact.

18. The frequency-sensitive shock absorber of claim 11, wherein the valve assembly further comprises a disc spring configured to elastically press the housing toward the main valve.

19. The frequency-sensitive shock absorber of claim 11, wherein in at least one region in which the pilot valve faces the housing, an accumulator is formed to maintain and mitigate the pressure in the pilot chamber.

20. The frequency-sensitive shock absorber of claim 11, wherein the valve assembly comprises:

a washer mounted on the body pin in the other direction opposite to one direction in which the pilot valve faces the housing; and a spacer mounted on the body pin and configured to maintain an interval between the pilot valve and the housing, and wherein when the pilot valve is elastically deformed, the pilot valve pushes the washer, and a repulsive force against the force for pushing the washer presses the housing toward the main valve.

* * * * *